E. H. BALLOU.
NUT LOCK.
APPLICATION FILED DEC. 18, 1912.
1,067,455.
Patented July 15, 1913.
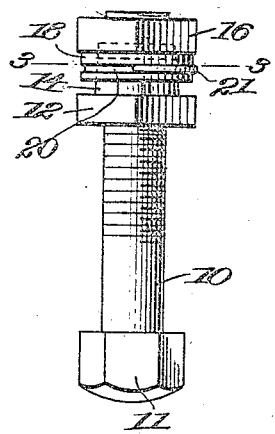
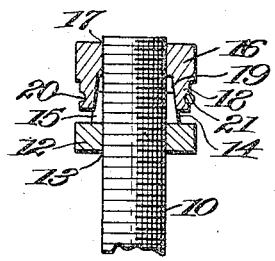
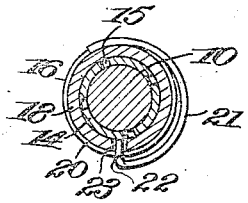
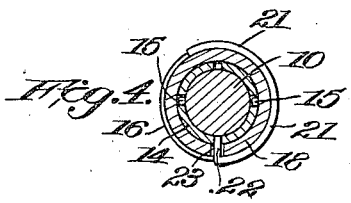
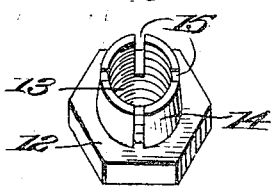
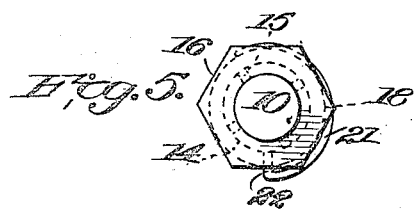
WITNESSES
INVENTOR
Ernest H. Ballou,
his Attorney

UNITED STATES PATENT OFFICE.

ERNEST H. BALLOU, OF BINGHAMTON, NEW YORK.

NUT-LOCK.

1,067,455.

Specification of Letters Patent.

Patented July 15, 1913.

Application filed December 18, 1912. Serial No. 737,550.

*To all whom it may concern:*

Be it known that I, ERNEST H. BALLOU, a citizen of the United States, residing at Binghamton, in the county of Broome and State of New York, have invented new and useful Improvements in Nut-Locks, of which the following is a specification.

The present invention relates broadly to a nut locking device and one wherein are embodied the elements of simplicity and durability.

An object of my invention is to provide an improved nut locking device, and more particularly mechanism for preventing rotation of the locking device, proper, upon the bolt.

Another object of my invention is to provide a device of the foregoing character wherein means are provided for locking the nut proper upon the bolt, and means also employed for preventing the reverse movement of the locking means upon the bolt consequently assuring the rigidity of the same.

A further object of my invention is to provide a device of the character set forth above wherein the nut proper is frictionally held in a locked position upon the bolt, means being also employed for preventing the reverse movement of the locking means and consequent releasement of the nut or the lock.

A still further object of the invention is to provide a device of the above character which consists of but a few simple parts whereby it may be manufactured and placed upon the market at a minimum cost.

Many disadvantages have been found in existing forms of nut locks. These disadvantages result from different existing conditions and according to the theory by which the nut is locked. In a device of this particular character, wherein the nut is frictionally held upon the bolt, apparently the nut is held rigid and its reverse movement prevented. After experimenting and realizing that this form of nut lock is inefficient for its purpose I have devised means which overcome the existing difficulty. This means comprises a coiled elastic member which is frictionally carried by the locking member and employed to prevent the reverse movement thereof which in most cases is caused by the jarring. While the nut proper is, in the ordinary cases, securely locked at first, the locking member tends to rotate upon the bolt thus releasing the frictional engagement between the nut and the bolt and destroying the rigidity of the same. In my invention the locking device is securely held against rotation through the medium of the aforesaid elastic member thus preventing accidental dislodgment of the locking device and consequent releasement of the nut.

With the above and other objects in view my invention relates to such details of construction and in the arrangement and combination of the parts as will be hereinafter fully described and specifically set forth in the appended claims.

In describing my invention in detail reference will be had to the accompanying drawings wherein like characters denote like or corresponding parts throughout the several views and in which:

Figure 1 is a side elevation of my invention showing the nut in a locked position. Fig. 2 is a vertical sectional view of the locking device illustrating the engagement between the locking device and nut proper, the bolt however being shown in elevation. Fig. 3 is a sectional view taken on line 3—3 of Fig. 1. Fig. 4 is a sectional view of the device such as shown in Fig. 3 however the locking elastic member is shown in a different position. Fig. 5 is a plan view of the device showing the hidden parts in dotted lines. Fig. 6 is a perspective view of the nut proper.

In the accompanying drawings, my invention has been illustrated in connection with the ordinary form of bolt, now in common use, but it will be appreciated that this selection does not limit the use of the device in the least in view of the fact that the same is readily applicable to other forms of bolts.

Consistent with the above I have illustrated a bolt 10 having a portion thereof screw threaded as shown and carrying the usual polygonal shaped head portion 11 at its lower extremity. The nut which I have illustrated consists of a body portion 12 being substantially polygonal in shape, the body portion having an interior screw threaded opening 13 provided centrally therein which communicates with the interior bore of an extension 14 provided upon the nut. The interior bore of the extension is also screw threaded as is shown, so that the operativeness of the nut upon the bolt is not hindered in the least.

Upon reference to Fig. 2 of the drawings it will be recognized that the base of the extension 14 is considerably wider than the frustum thereof consequently providing a conical or slanting face or wall. While the outer faces of the extension are slanting, to form a substantially wedge shaped member its inner face is substantially vertical and does not impede the rotation of the nut to any degree. For the purpose that will presently appear, the extension 14 is provided with a series of vertically extending slots 15. While a certain number of slots has been illustrated in the drawings it is to be appreciated that this number is merely shown to illustrate the operativeness of the device and that any number may be provided at the desire of the owner.

The locking device of my invention consists of a nut 16 having a central opening 17 formed therein which as is apparent, is screw threaded to receive the similarly formed portion of the bolt. While the nut 17 has its extension projecting from the upper side thereof the locking device has its projection depending from the under side thereof, the projection being designated in the drawings by the numeral 18. The inner faces of the projection are spaced a slight distance from the interior bore of the member and are cut slanting as shown at 19, the mouth of the projection being considerably wider than the base thereof.

In the operation of my invention the nut is first screwed upon the bolt to the desired distance, after which the locking device is disposed thereon and rotated until it resumes the position shown in Fig. 2. The action of the slanting face of the projection 18 upon the springy segments of the extension 14 will tend to force the latter into the bolt in such a manner that the threads upon the latter are distorted to a material extent thus readily assuring the rigidity of the nut. It will be recognized that as more slots are provided in the extension 14 its elasticity is increased thus being more easily forced inwardly than would be ordinarily the case.

Consistent with the above remarks, I have provided an auxiliary locking means designed to assure the rigidity of the locking device upon the bolt. With this in view I have provided the outer face of the projection 18 with an annular depression 20 in which is disposed an elastic member 21, one end 22 of the same however formed into a tongue extending through the opening 23 in the projection and being held in engagement with the extension 14 through the springy action of its body portion. While the end 22 of the elastic member is normally held in engagement with the extension 14, it will be recognized that if for any reason the locking device is rotated or starts to rotate, this end will drop into one of the slots 15 in the extension and check its rotation and prevent the destroying of the locking action imparted to the nut 12. The greatest of stress is laid upon the simplicity of the auxiliary locking member inasmuch as this provision overcomes the difficulty heretofore existing in this art and obviously assures the efficient locking of the nut upon the bolt.

From the foregoing it is thought that the advantages and novel features of my invention will be readily comprehended.

Such changes as are permissible by the subjoined claims may be resorted to without departing from the spirit of my invention.

Having thus fully described my invention what I claim as new and desire to secure by Letters Patent is:

1. In a device of the class described, the combination of a bolt, a nut device operable thereon, a locking device disposed on said bolt, one of said devices provided with a conical portion, the other of said devices provided with a recess having a conical wall to receive said portion, a yieldable locking member carried by one of said devices provided with a tongue, each of said devices provided with a slot, said tongue adapted to enter both of said slots.

2. In a device of the character described, the combination of a bolt, a nut operable thereon, provided with an extension, a locking device disposed upon said bolt, a projection on said locking device, having its inner bore provided with a wall extending at an angle to the axis of the bolt, said bore of said projection receiving said extension, said projection provided with an arcuate recess, and a locking member disposed within said recess and extending through said projection and into said extension, as and for the purpose set forth and described.

3. In a device of the class described, the combination of a bolt, a nut device operable thereon, a locking device disposed on said bolt, one of said devices provided with a conical portion, the other of said devices provided with a recess having a conical wall to receive said portion, a locking member of spring material carried by one of said devices having a tongue portion to engage the device to removably fasten the locking member thereto, and the other device provided with a slot, said tongue adapted to enter said slot.

ERNEST H. BALLOU.

Witnesses:
PETER P. LINNEEN,
T. H. GUYAM.